United States Patent
Breugelmans et al.

(10) Patent No.: US 11,762,204 B2
(45) Date of Patent: Sep. 19, 2023

(54) HEAD MOUNTABLE DISPLAY SYSTEM AND METHODS

(71) Applicant: Sony Interactive Entertainment Inc., Tokyo (JP)

(72) Inventors: Mark Jacobus Breugelmans, London (GB); Philip Cockram, London (GB); Calum Armstrong, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/728,218

(22) Filed: Apr. 25, 2022

(65) Prior Publication Data

US 2022/0350151 A1 Nov. 3, 2022

(30) Foreign Application Priority Data

Apr. 28, 2021 (GB) .................................... 2106066

(51) Int. Cl.
*G02B 27/01* (2006.01)
*G06F 3/01* (2006.01)
*G02B 27/00* (2006.01)

(52) U.S. Cl.
CPC ..... *G02B 27/0172* (2013.01); *G02B 27/0093* (2013.01); *G02B 27/0101* (2013.01); *G02B 27/0179* (2013.01); *G06F 3/011* (2013.01); *G02B 2027/0118* (2013.01); *G02B 2027/0138* (2013.01); *G02B 2027/0187* (2013.01)

(58) Field of Classification Search
CPC ............. G02B 27/0172; G02B 27/017; G02B 27/0093; G02B 2027/014; G02B 2027/0178; G02B 2027/0138; G02B 2027/0118; G02B 27/0101; G02B 27/093; G02B 2027/0187; G06T 19/006; G06F 3/011; G06F 3/012
See application file for complete search history.

(56) References Cited

U.S. PATENT DOCUMENTS

| | | | |
|---|---|---|---|
| 10,055,887 B1 | 8/2018 | Gil | |
| 11,211,030 B2* | 12/2021 | Bonnier | G02B 27/017 |
| 2018/0075820 A1* | 3/2018 | Hicks | G06F 3/14 |
| 2019/0033600 A1 | 1/2019 | Raghoebardajal | |
| 2020/0195940 A1* | 6/2020 | Noorkami | G11B 27/02 |

FOREIGN PATENT DOCUMENTS

| | | |
|---|---|---|
| EP | 3767432 A1 | 1/2021 |
| WO | 2019046215 A1 | 3/2019 |

OTHER PUBLICATIONS

Combined Search and Examination Report for corresponding GB Application No. 2106066, 11 pages, dated Jan. 21, 2022.

* cited by examiner

*Primary Examiner* — Xuemei Zheng
(74) *Attorney, Agent, or Firm* — Matthew B. Dernier, Esq.

(57) ABSTRACT

A head mountable display, HMD, system to display images to a user via an HMD includes an illumination detector to detect an illumination level of an ambient environment around the HMD; an operation detector to detect one or more operations indicative of one or both of: (i) initiation of the HMD being put on by the user; and (ii) initiation of the HMD being taken off by the user; and a controller to control the illumination level of the display images, the controller being configured to generate and apply a temporary illumination level variation to the display images in response to a detection of the one or more operations by the operation detector.

30 Claims, 8 Drawing Sheets

LEFT — RIGHT

LEFT — RIGHT

HEAD MOUNTABLE DISPLAY SYSTEM AND METHODS

BACKGROUND

Field of the Disclosure

The present disclosure relates to head mountable display, HMD, systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus. In an HMD, an image or video display device is provided which may be worn on the head or as part of a helmet. Either one eye or both eyes are provided with small electronic display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure provides a head mountable display, HMD, system to display images to a user via an HMD, the HMD system comprising:

an illumination detector to detect an illumination level of an ambient environment around the HMD;

an operation detector to detect one or more operations indicative of one or both of: (i) initiation of the HMD being put on by the user; and (ii) initiation of the HMD being taken off by the user; and a controller to control the illumination level of the display images, the controller being configured to generate and apply a temporary illumination level variation to the display images in response to a detection of the one or more operations by the operation detector.

The present disclosure also provides a method comprising:

generating display images for display to a user via a head mountable display, HMD;

detecting an illumination level of an ambient environment around the HMD;

detecting one or more operations indicative of one or both of: (i) initiation of the HMD being put on by the user; and (ii) initiation of the HMD being taken off by the user; and controlling an illumination level of the display images by generating and applying a temporary illumination level variation to the display images in response to a detection of the one or more operations.

The present disclosure also provides a head mountable display, HMD, system comprising:

an image generator to generate display images for display to a user via an HMD; and a controller to control the illumination level of the display images, the controller being configured to generate and apply an illumination level variation to the display images so as to apply a smoothing operation to the illumination level.

The present disclosure also provides a method comprising:

generating display images for display to a user via an HMD; and controlling the illumination level of the display images by generating and applying an illumination level variation to the display images so as to apply a smoothing operation to the illumination level.

The present disclosure also provides computer software which, when executed by a computer, causes the computer to perform the methods defined above.

The present disclosure also provides a non-transitory, machine-readable storage medium by which such computer software is stored.

Various further aspects and features of the present disclosure are defined in the appended claims and within the text of the accompanying description.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
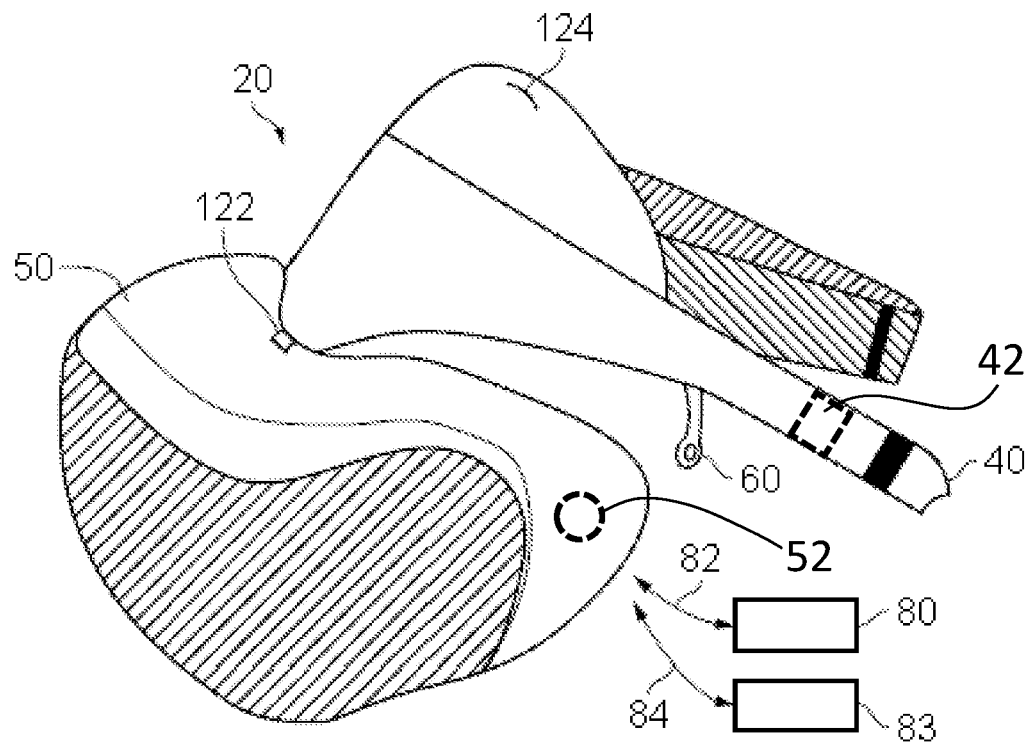
FIG. 1 schematically illustrates an HMD to be worn by a user.

Referring now to the drawings, wherein like reference numerals designate identical or corresponding parts throughout the several views, in FIG. 1 an HMD 20 (as an example of a generic head-mountable apparatus) is wearable by a user. The HMD comprises a frame 40, in this example formed of a rear strap and an upper strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, one image for each eye.

The HMD has associated headphone audio transducers or earpieces 60 which fit into the user's left and right ears. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter. In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. The external apparatus could communicate with a video server. Audio signals for the earpieces 60 can be carried by the same connection. Similarly, any control signals passed from the HMD to the video (audio) signal source may be carried by the same connection. The external video signal source 80 can therefore provide an example of an image generator to generate display images, which in turn may be implemented by a game engine. The head-mountable display is configured to display the display images generated by the video signal source 80.

Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply;

(e) an HMD having an on-board power supply and a wireless connection to a video and/or audio signal source;

(f) an HMD having an on-board power supply and its own video and/or audio signal source; or (g) an HMD having its own power supply and no cabled connections to any other device.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling or diverting down behind the ear. In other (not full immersion) examples, the user's view of the external environment may not in fact be entirely obscured; the displayed images could be arranged so as to be superposed (from the user's point of view) over the external environment.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. These can cooperate to display three dimensional or two dimensional content.

In some situations, an HMD may be used simply to view movies, or other video content or the like. If the video content is panoramic (which, for the purposes of this description, means that the video content extends beyond the displayable area of the HMD so that the viewer can, at any time, see only a portion but not all of the video content), or in other uses such as those associated with virtual reality (VR) or augmented reality (AR) systems, the user's viewpoint needs to track movements with respect to a real or virtual space in which the user is located. Arrangements to achieve this will be discussed with reference to FIGS. 5, 6a and 6b.

Figure 2:
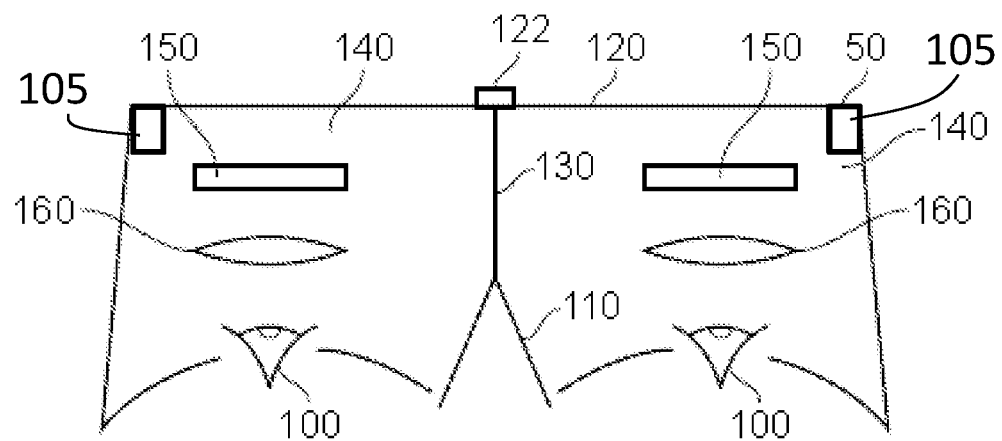
FIG. 2 is a schematic plan view of an HMD.

Various other sensors and detections may be implemented in connection with the HMD of FIG. 1 and FIG. 2.

In FIG. 1, a schematic touch sensor 52 on the outer periphery of the HMD is illustrated. Although this is shown as a relatively small circular area, it could encompass a broader region of the HMD, for example a region at each side of the HMD (only the left side is worn being shown in the perspective view of FIG. 1). The touch sensor can provide a detection arrangement to detect user touch to the periphery of the HMD indicative of the HMD being handled by the user. In example arrangements to be discussed below, this can be used to detect the HMD being handled, for example at the initiation of an action by the user to put on or to take off (doff) the HMD.

In an alternative example (which may be used instead of or in addition to that described above) one or more peripheral control devices such as a hand-held controller 330 to be described below (the term "peripheral" referring to the nature of the control device as an adjunct to the remainder of the HMD system rather than to any physical aspect of the configuration of the control device itself). Here, the operation detector may comprise one or more touch sensors configured to detect user touch to a peripheral control device indicative of that peripheral control device being handled by the user. The detection of the touching of the peripheral control device may be taken by the present techniques as indicative of the user being about to put on the HMD. In some examples, the detection of a cessation of touching of the peripheral control device may be taken by the present techniques as indicative of the user being about to doff the HMD. It is not a requirement that touch of the external surface of the peripheral control device is detected; instead or in addition, movement of the peripheral control device could be detected (for example by an accelerometer or even by a camera viewing the peripheral control device) as an indication that the user is holding the peripheral control device.

FIG. 1 also shows a schematic sensor arrangement 42. In some examples, this may represent a detector, for example on the inside surface of the frame 40, such that it is configured to detect an ambient illumination level at a portion of the HMD which, in use, is substantially in contact with (or at least substantially obscured by) the user's head while the user is wearing the HMD. In other words, if the illumination level at the inside of the frame 40 is detected to be low (dark) this is an indication that the HMD is probably being currently worn. If the illumination level at the inside of the frame 40 is detected to be high, this is an indication that the HMD is probably currently unworn.

A similar function may be performed by, for example, one or more cameras 105 internal to the structure of the HMD and which will be described further below.

In other examples, the sensor arrangement 42 may be (or may include) a detector such as an accelerometer configured to detect a change in a current position and/or orientation of the HMD.

In other examples, the censor arrangement 42 may be (or may include) a touch detector at an internal (head-contacting) surface of the HMD or the frame 40, to provide an indication that the HMD is currently worn on the head.

These sensor arrangements (one or more of the above examples being implemented) provide an example of an operation detector to detect one or more operations indicative of one or both of: (i) initiation of the HMD being put on by the user; and (ii) initiation of the HMD being taken off by the user. For example, detection of a peripheral touch as described above can be indicative of either (i), if the HMD is currently not being worn, or (ii), if the HMD is currently being worn. Detection of a change in a current position and/or orientation can be indicative of at least (i) if the HMD is currently not worn. The detection of whether the HMD is currently worn or not can be provided by various detections including the ambient illumination level detection on the inside of the frame 40 or by the one or more cameras 105, or by an internal touch sensor 42.

It is noted that the indications mentioned above may provide the operation detector with an "advance" indication that a currently-worn HMD is about to be doffed or that a currently-not-worn HMD is about to be put on, or in other words an indication of the initiation of a process to put on or to doff the HMD. A similar, though in some respects less advanced, indication of a current wearing status can be provided by the internal touch sensor 42, the internal illumination sensor 42 (or as implemented by the camera(s) 105) for example. Such an indication, if the first such indication, can still be considered as detection of initiation of such a process.

The HMD may also implement an illumination detector to detect an illumination level of an ambient environment around the HMD.

In some examples, such an illumination detector may comprise an optical detector mounted on the HMD. For example, this functionality may be provided by detecting an illumination level as detected by the front-facing camera 122 or by a simpler (not a camera) illumination detector mounted on the external periphery of the HMD, for example at or near the position indicated in FIG. 1 of the front-facing camera 122.

Another example of an illumination detector suitable for use in the present techniques may be SLAM (simultaneous location and mapping) camera (such as an infra-red SLAM camera) mounted on the HMD, for example at or near the location identified for the front-facing camera 122. Here, the SLAM camera is named as such because it provides image inputs to a SLAM processor (not shown in the drawings). SLAM processing allows for a map of the region in the field of view of the camera to be established from a succession of images captured from a moving viewpoint (as would be the expectation in the normal use of an HMD) and also allows the location of the camera to be computed relative to the computed map. Therefore, SLAM techniques can form a powerful and potentially very useful addition to an HMD. The camera or cameras used to capture images for use in SLAM processing may operate using infra-red image capture and optionally illumination, but can also be arranged or provided with processing so as to provide an output indicative of ambient illumination.

Although the sensors discussed above are described as being provided as part of the structure or operation of the HMD, similar detections may be achieved using one or more sensors external to the HMD. For example, an external camera 305 to be described below with reference to FIG. 3 can capture images relating to the current configuration and status of the HMD, for example by capturing images of optical or other markers, whether illuminated or passive, disposed on or forming part of the HMD. From such images, a base device such as that described below can detect aspects such as whether the HMD is currently being worn, for example by detecting a human body below the HMD, whether the HMD is moving, and ambient light level around the HMD and the like. Note that in other examples the base device can detect whether the HMD is being worn by detecting user interaction with the HMD system. In some examples the illumination detector may be provided or supplemented by one or both of a time of day detector and a geographical location detector. Therefore, although various examples make use of sensors provided at the HMD itself, it is not necessary that an HMD system providing functionality to be discussed below actually include the HMD itself.

Turning to the camera(s) 105, one example use of these has been discussed above. Other potential functionality will now be described. Note that the camera(s) 105 may be directed towards the user's eye(s) when the HMD is being won in normal use, and may operate using illumination provided by displayed images and/or using illumination provided by one or more infra-red or other illuminators (not shown).

In some examples, the camera(s) can be arranged to detect the pupil size of one or both of the user's eyes.

The video signal source 80 can have an associated aspect of the operation detector so as to be configured to detect an operation state of the image generator indicative of the user having finished an activity using the HMD. For example, in the case of a game engine, the game engine can be configured to detect the end of a game-playing activity, whether that end is initiated by the user closing the game or by the user successfully finishing all aspects of a game such that the user has naturally reached the end of the game. In other examples, in the case of the video signal source 80 being a source of a movie or other video content for the user to watch, once again the video signal source 80 can detect the user terminating the viewing of a particular item of content or the item of content naturally reaching its end.

In other examples, instead of or potentially in addition to the pupil size detection, the camera(s) can be arranged to detect a gaze direction of the user.

Figure 3:
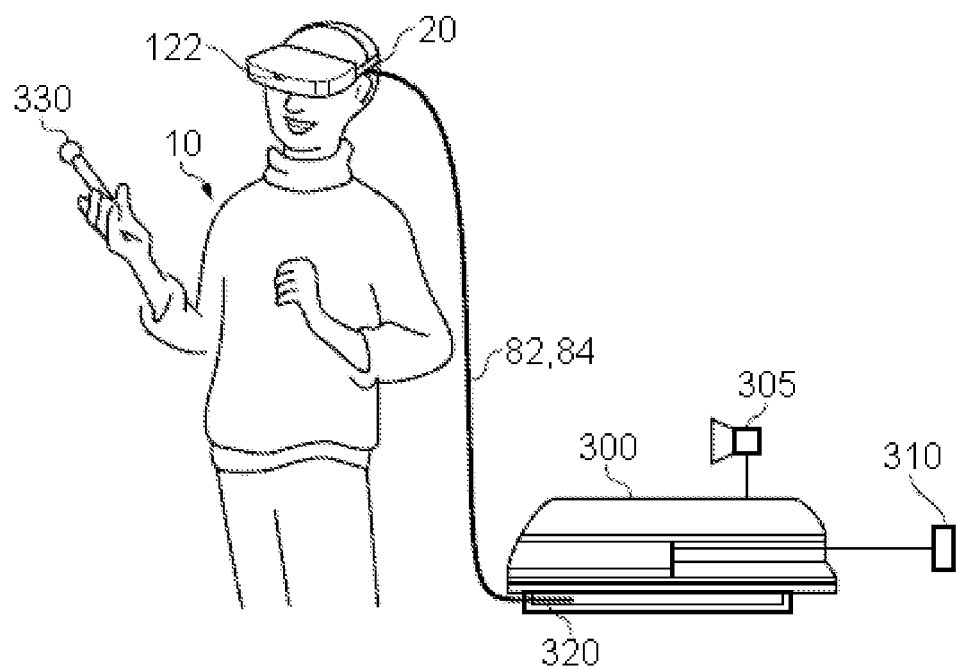
FIGS. 3 and 4 schematically illustrate a user wearing an HMD connected to a Sony® PlayStation® games console.

FIG. 3 schematically illustrates a user wearing an HMD connected to a Sony® PlayStation® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 3, the user is also shown holding a hand-held controller 330 which may be, for example, a Sony® Move® controller which communicates wirelessly with the games console 300 to control (or to contribute to the control of) operations relating to a currently executed program at the games console.

The camera 305 is associated with the console 300 to capture images of the user 10 and/or the controller 330.

The video displays in the HMD 20 are arranged to display images provided via the games console 300, and the earpieces 60 in the HMD 20 are arranged to reproduce audio signals generated by the games console 300. The games console may be in communication with a video server. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 4:
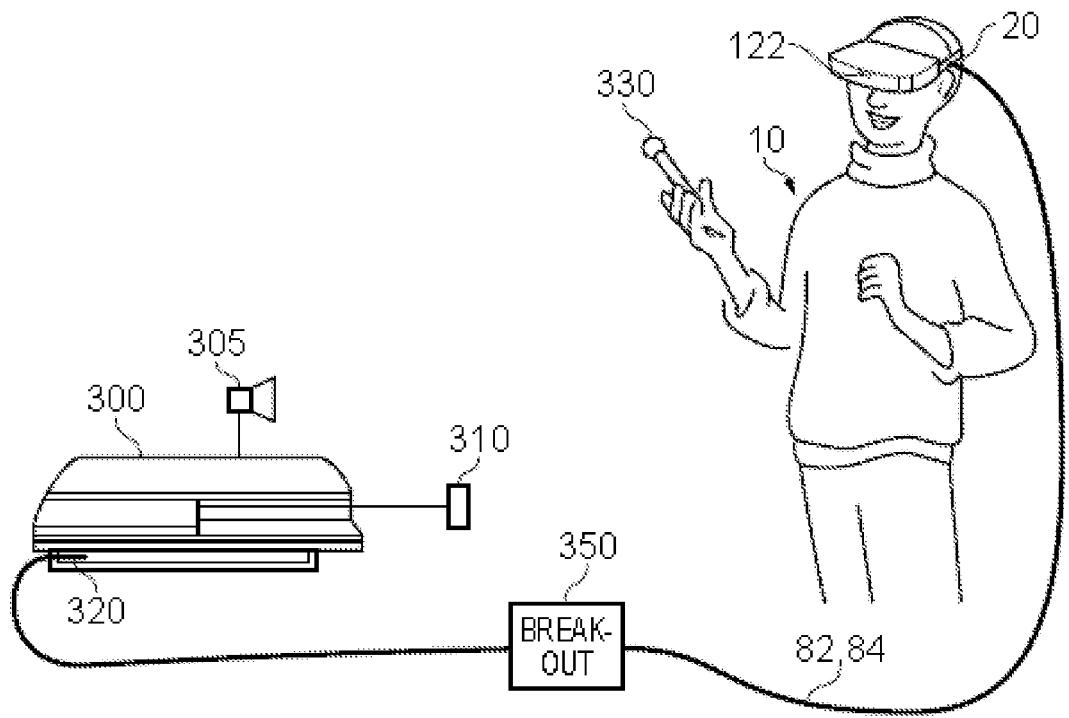

FIG. 4 schematically illustrates a similar arrangement in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source (for example, sensor) signals, on which the processing is to take place, could be distributed to another device, or the processing results from the processing of those source signals could be sent to another device, as required. So any references to processing taking place at a particular device should be understood in this context.

As mentioned above, in some uses of the HMD, such as those associated with panoramic video content viewing, virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

In embodiments of the disclosure, processing is carried out to change the lighting conditions as viewed by the HMD wearer in response to changes in the real ambient lighting conditions experienced by that user, or to change the real ambient lighting conditions experienced by the HMD user in response to changes in the lighting conditions as viewed by the HMD wearer. This is an example of the use of a head mountable display (HMD) system comprising: a detector to detect an illumination level in one of a display image for display to a user via an HMD and an ambient environment around the HMD; and a controller to control an illumination level in the other of the display image for display to a user via an HMD and the ambient environment around the HMD, according to (or in response to) the detection.

An example of this type of variation will be discussed with reference to FIGS. 5 to 8.

Figure 5:
FIG. 5 schematically illustrates an HMD in bright ambient lighting conditions.
Figure 5:
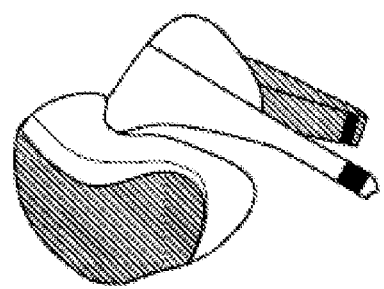
Figure 6:
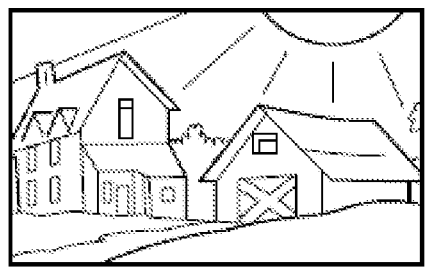
FIG. 6 schematically illustrates a pair of example display images to be displayed by the HMD of FIG. 5.
Figure 6:
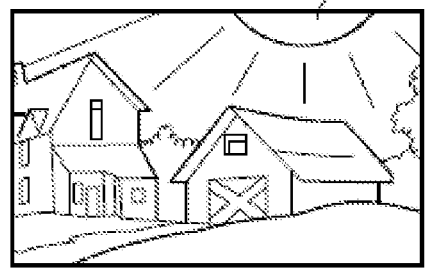

FIG. 5 schematically illustrates an HMD in bright ambient lighting conditions, and FIG. 6 schematically illustrates a pair of example display images to be displayed by the HMD of FIG. 5 (with an example sun 600 showing the images represent a bright scene). The example of FIGS. 5 and 6 applies to either type of variation (varying the lighting of the display images as viewed by the HMD, or varying the external ambient lighting conditions). A brighter external ambient lighting level corresponds to a brighter as-viewed lighting level in the HMD images.

Figure 7:
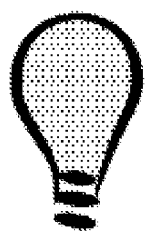
FIG. 7 schematically illustrates an HMD in dim ambient lighting conditions.
Figure 7:
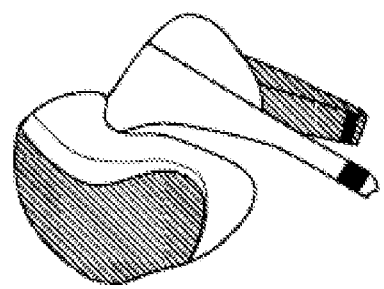
Figure 8:
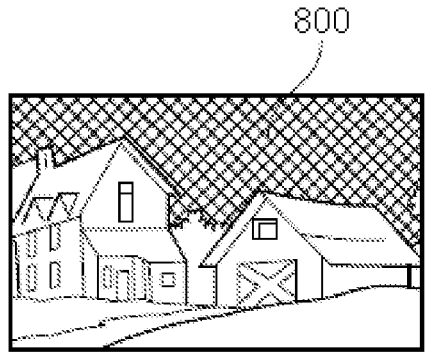
FIG. 8 schematically illustrates a pair of example display images to be displayed by the HMD of FIG. 7.
Figure 8:

FIG. 7 schematically illustrates an HMD in dim ambient lighting conditions and FIG. 8 schematically illustrates a pair of example display images to be displayed by the HMD of FIG. 7 (with example clouds or a darker sky 800 to represent a darker scene). Again, the example of FIGS. 7 and 8 applies to either type of variation (varying the lighting of the display images as viewed by the HMD, or varying the external ambient lighting conditions). A darker external ambient lighting level corresponds to a darker as-viewed lighting level in the HMD images.

Figure 9:
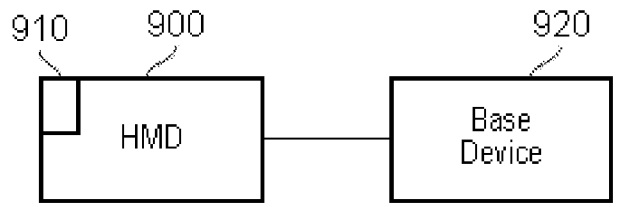
FIGS. 9 and 10 schematically illustrate example configurations of an HMD system.
Figure 10:
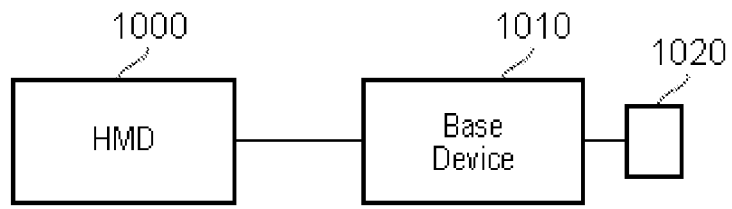
Figure 11:
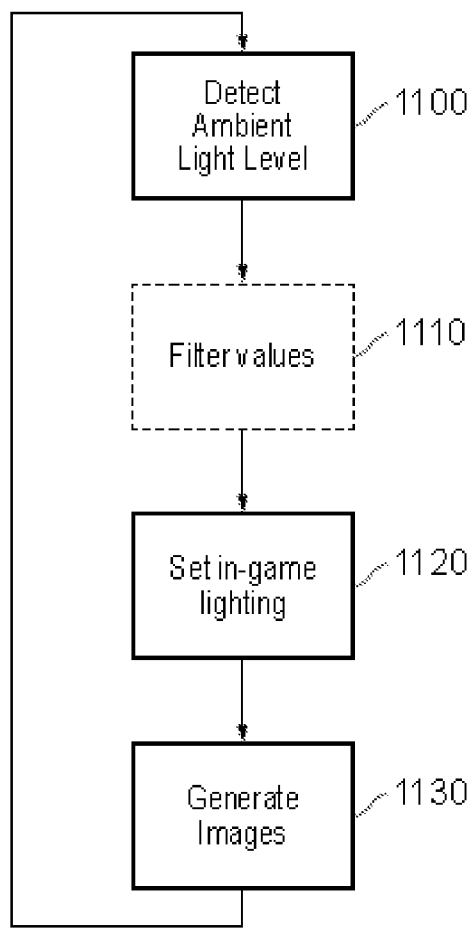
FIGS. 11 and 12 are respective schematic flowcharts showing operations of an example HMD system.

FIGS. 9 and 10 schematically illustrate example configurations of an HMD system, and FIG. 11 is a schematic flowchart showing operations of an example HMD system. These examples relate to an arrangement in which the as-viewed lighting level in the HMD images is varied in response to a detected external ambient lighting level.

In FIG. 9, an HMD 900 comprises a light level sensor 910 as an example of an optical detector. An example of such a sensor is the camera 122 in FIG. 1. In an alternative, in place of (or in addition to) the camera 122, a sensor such as a photocell or photo resistor could be provided on the HMD. If a camera is used, its sole function could be that of a light level sensor, or its images could also be used for other purposes as well.

A base device 920 provides display images for display by the HMD 900. A games machine and/or breakout box (of the types shown in FIGS. 3 and 4) are examples of base devices. Note however that all of the processing being described here could in fact be implemented as part of circuitry forming the HMD 900. The HMD and base device are connected by a wired or wireless link as discussed above.

An alternative arrangement is shown in FIG. 10, in which an HMD 1000 is associated with a base device 1010, which in turn is associated with a light level sensor 1020. An example of such a light level sensor is the camera 305 of FIGS. 3 and 4. Again, the images from the camera 305 could be used only for light level sensing, or could be used for other purposes as well as light sensing. In an alternative, a light sensor of another type such as those discussed above could be associated with the console 300 or breakout box 350.

FIG. 11 provides a schematic flowchart illustrating operations of the arrangements of FIG. 9 or 10.

The example considered in FIG. 11 relates to game play, in which the base device comprises a game engine to generate display images for display by the HMD.

At a step 1100, the system (for example, the base device) detects the ambient light level appropriate to the HMD wearer, for example making use of a signal from the sensor 910 or 1020.

At an optional step 1110, the detected light levels are filtered, for example by applying a low pass or smoothing filter so as to avoid (or reduce the effect of) any abrupt changes in light level. An example time constant or characteristic time period for such a filter is 10 seconds. (Note that as an alternative or in addition to filtering the detected light levels, the in-game lighting levels established at a step 1120 to be discussed below could be filtered).

At the step 1120, an in-game lighting level is set in response to the detected (or detected-and-filtered) light levels. If the ambient light level reduces, the in-game lighting is dimmed. if the ambient light level increases, the in-game light level is increased. The variation can be with respect to a respective base in-game light level associated with each in-game scene. So, each scene has its own "normal" light level, and variations are made, for example by applying a weighting of, say, between −25% and +25%, to the normal light level. In examples, this can be applied by a simple scaling of light levels. In other examples, the scene can be changed amongst pre-determined alternative scenes, for example a scene on a sunny day, the same scene but on an overcast day, and the same scene on a moonlit evening.

At a step 1130, display images for display by the HMD are generated by the game engine according to the lighting levels established in the step 1120.

The process then repeats. In some examples, the loop of FIG. 11 could be carried out at every generated display image, which is to say, at the frame rate of the system. in other examples, the loop is carried out every n generated frames, or every m seconds (for example, n could be 100 or m could be 2).

Figure 12:
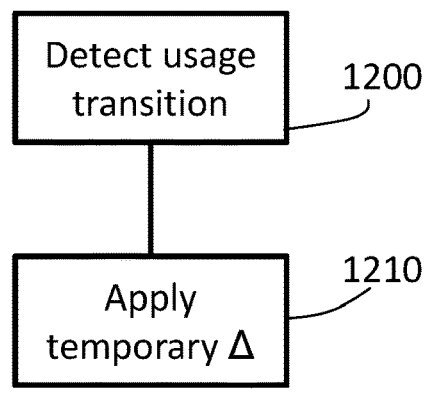

Referring to FIG. 12, a schematic flowchart is represented in which, at a step 1200, the HMD system detect a usage transition of the HMD, for example a currently-not-worn HMD being put on (or at least the initiation of it being put on) or a currently-worn HMD being doffed (or at least the initiation of it being taken off). At a step 1210, a temporary variation in the illumination of display images to be displayed by the HMD is applied.

In some examples, the variation in illumination or brightness of the display images to be displayed is implemented by the base device, video signal source or other arrangement providing the display images (for example by controlling operation of a game engine so as to vary the illumination of the display images). In other examples, the variation may be implemented by post-processing of those display images, which could be performed at the video signal source or by processing at the HMD itself. Either example provides a controller to control the illumination level of the display images, the controller being configured to generate and apply a temporary illumination level variation to the display images in response to a detection of the one or more operations by the operation detector.

In some examples, the aim of these techniques is to alleviate the potential visual disturbance to the user of an abrupt change in brightness as perceived by the user's eyes. In the case that the HMD is currently not being worn, it could be potentially disturbing or least cause potential discomfort to the user to experience an abrupt change between ambient illumination (before the HMD is put on) and in-experience (for example, in-game) illumination once the HMD has been put on. Similarly, in the case that the HMD is currently in use and is being worn, it could be potentially disturbing or at least cause potential discomfort to the user to experience an abrupt change between the in-experience or in-use illumination before the HMD is doffed and the ambient illumination afterwards.

Therefore, in example arrangements, a temporary change in illumination can be applied. The temperature range is applied to the HMD display illumination with the aim of reducing the abruptness of a change between HMD illumination and ambient illumination.

Examples will now be discussed with reference to FIGS. 13 and 14. Here, display image brightness is shown on a vertical axis and time along a horizontal axis.

Figure 13:
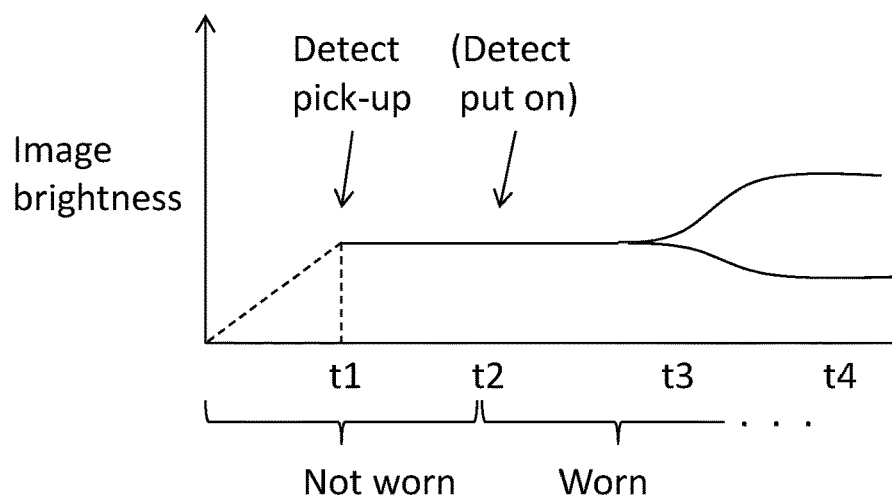
FIGS. 13 to 16 are respective schematic graphs of image brightness against time.

Referring to FIG. 13, the HMD is not worn until a time t2 and is worn after that time. In advance of the time t2, the HMD system may detect the initiation of an action to put on the HMD, for example using any of the techniques described above, for example detecting the picking up (or touching) of the HMD at a time t1 before the time t2.

Before the time t2, it is immaterial what the display brightness of images provided to the HMD is, because the HMD system is aware that the HMD is not currently being worn. Therefore, image brightness before the time t1 in FIG. 13 is shown by a choice of broken lines illustrating arbitrary brightness levels. From the time t1 until after the HMD has been put on, a variation can be applied to the display brightness of images to be displayed by the HMD so that the display brightness depends upon the ambient brightness of ambient illumination around the HMD. The variation is a temporary variation so that between the example times t3 and t4, the display brightness transitions to reach a display brightness appropriate to the content being displayed by the HMD. In FIG. 13, two possible outcomes are shown indicative of options in which the eventual display brightness appropriate to the content being displayed is greater than or less than the initial display brightness controlled by the temporary variation.

Note that in this diagram, a period of constant brightness (t1-t3) followed by a transition period (t3-t4) is illustrated purely as one example. Other examples are of course possible. In another arrangement, the time t3 could effectively be coincident with t1 such that the transition period starts when pickup is detected and ends at some point, for example dependent upon a characteristic time period, after HMD wearing is detected. The transition could be a smooth transition, a linear transition or the like. In examples in which an initial display brightness is selected by the HMD system at or after the detection of pickup, that initial display brightness could be independent of the display brightness of the images as generated, for example depending only upon the ambient illumination as detected, or could be expressed as a proportional (multiplicative) or additive reduction or augmentation of the display brightness of the images as generated.

Therefore, in some examples, the illumination detector is configured to detect a current illumination of the display images; and the controller is configured to apply the temporary illumination level variation as a variation relative to the current illumination of the display images. In other examples, the controller is configured to set the current illumination of the display images to an illumination level dependent only on the detected illumination level of an ambient environment around the HMD.

The temporary illumination level variation may be configured to decay towards a zero variation according to a decay time constant, which may be a predetermined decay time constant.

The controller may be configured to compare the detected illumination level of the ambient environment with a predetermined range of ambient illumination levels and to generate the temporary illumination level variation in response to the comparison.

The controller may be configured to generate the temporary illumination level variation so as to decrease the illumination level of the display images in response to a detection by the illumination detector that the illumination level of the display images is relatively high and the illumination level of the ambient environment around the HMD is relatively low.

The controller may be configured to generate the temporary illumination level variation so as to increase the illumination level of the display images in response to a detection by the illumination detector that the illumination level of the display images is relatively high and the illumination level of the ambient environment around the HMD is relatively low.

The filter step 1110 mentioned above may be used to filter the detected illumination levels, for example by a low pass filter.

The arrangement of FIG. 13 does not in fact require the detection of picking up of the HMD as an advance initiation of the user putting it on. If the only detection is that the HMD is put on, then the display brightness of the first images to be displayed after the detection of the HMD being put on can be set using the techniques discussed above, with a transition to the intended display brightness taking place according to, for example, a characteristic time period.

Figure 14:
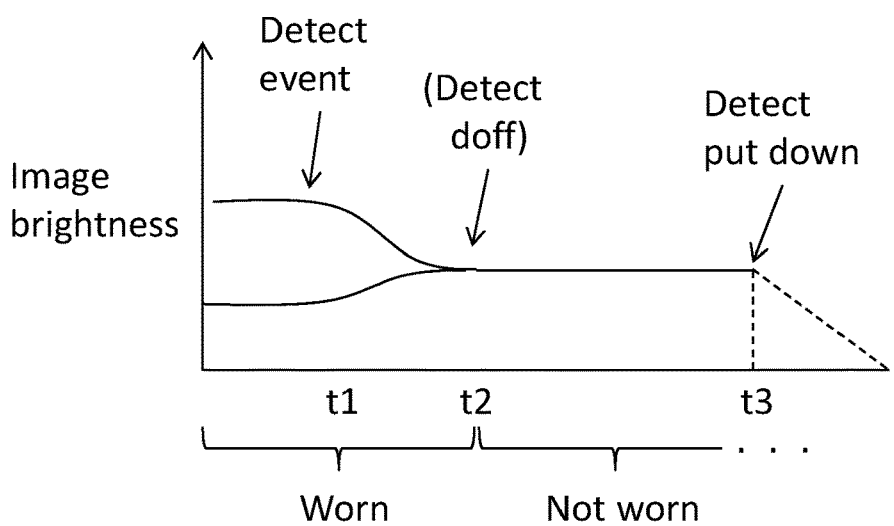

FIG. 14 provides a similar example relating to the taking off of the HMD. Here, an advanced detection of an initiation "event" (t1) may be made as discussed above, for example by detecting the user touching the HMD and/or by detecting an event at the display image source such as the end of the game or the end of content to be viewed.

In response to such a detection, the display brightness may be transitioned, for example with respect to a characteristic time period, towards a display brightness better matched to the detected ambient brightness. As shown by the different options during the early part of FIG. 14, this may be represented by a transition to a greater or a lower display brightness. The doffing of the HMD is then detected at a time t2. From there, the display brightness may be ramped down to zero or maintained until a detection of the HMD being put down (for example by accelerometer information, termination of touch sensing or the like).

In either FIG. 13 or FIG. 14, it is possible that the advanced detection at the time t1 turns out to be a false detection so that in FIG. 13 the user does not put on the HMD shortly after this time, or in FIG. 14, the user in fact continues to use the HMD. In such cases, if the actual detection of the transition between "not worn" and "worn" (in the relevant direction) has not been detected within a predetermined time such as five seconds after the advanced detection, any changes to the display brightness can be reversed or undone, for example by a gradual variation.

The arrangements discussed above may be supplemented by a user-operable control; in which the controller is configured to control the illumination level of the display images in response to user operation of the user-operable control.

An example of a characteristic time period relevant to the discussion above could be 10 seconds. Other examples may include 5 seconds or 3 seconds. As discussed above, a smooth transition according to the characteristic time period could commence at (or a predetermined time after) detection of a "first" event such as the picking up of the HMD as initiation of putting the HMD on, or the touching of the HMD as initiation of doffing the HMD. Or the transition could commence at (or a predefined time after) a detection of actual putting on (for example by obscuring of al light sensor 42 internal to the HMD or its frame) or taking off (for example by the un-obscuring of the light sensor 42).

Further examples will now be described which do not necessarily require or make use of the detection of ambient light levels. Instead, a controller may be configured to control the illumination level of the display images, the controller being configured to generate and apply an illumination level variation to the display images so as to apply a smoothing operation to the illumination level. This can avoid or alleviate subjectively disturbing or discomforting abrupt changes in display illumination.

Figure 15:
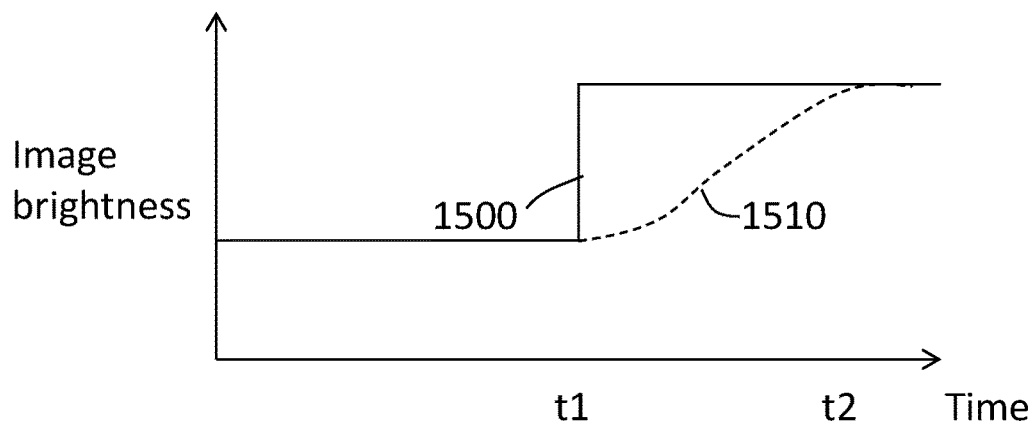
Figure 16:
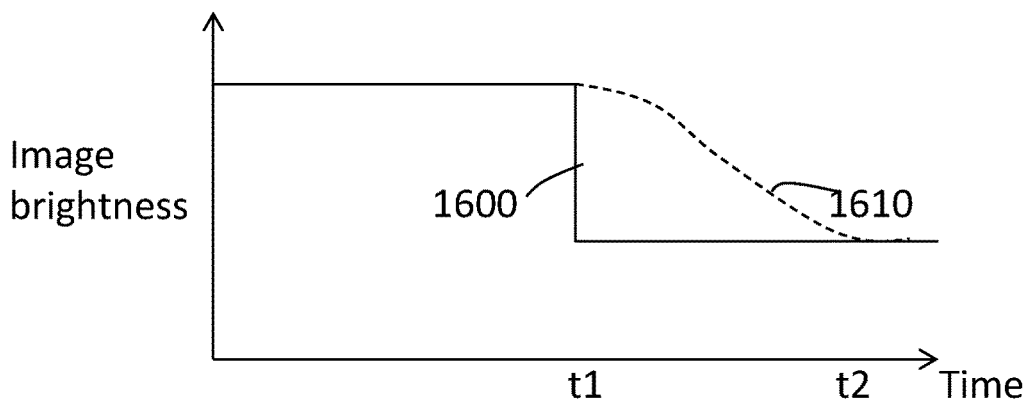

FIGS. 15 and 16 are schematic graphs illustrating image brightness on a vertical axis and time on a horizontal axis, with a variation 1500, 1600 in the "raw" or unfiltered display brightness of display images for display by an HMD be illustrated by a solid line and a smoothed variation 1510, 1610 being illustrated by a broken line. FIG. 15 relates to an abrupt increase at a time t1 of the raw display brightness of display images for display and shows that the increase is smoothed over a characteristic time period (schematically shown as t1 to t2) to reduce the abruptness of the variation. Similarly, in FIG. 16, and abrupt decrease in the raw display brightness at a time t1 is again smoothed over a characteristic time period (schematically shown as t1 to t2) to reduce the abruptness of the variation.

The smoothing operation can be performed by controlling the image generation process itself and/or by post-processing the generated images, for example at either or both of a base device and the HMD.

Figure 17:
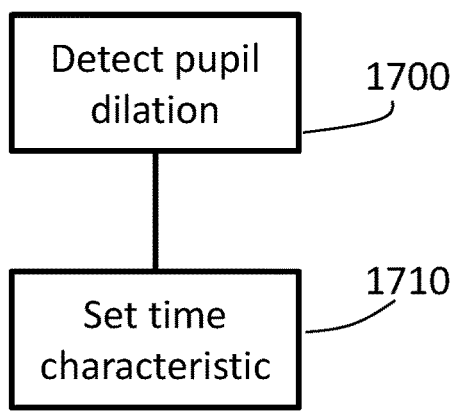
FIGS. 17 and 18 are respective schematic flowcharts showing operations of an example HMD system.

In some examples, a detection of pupil dilation, for example by the camera(s) 305, may be used to control at least in part the variation process described above. Referring to FIG. 17, at a step 1700, pupil dilation is detected and at a step 1710 the characteristic time period mentioned above is set according to the pupil dilation detected at the step 1700. So, in example arrangements, a detector can be configured to detect a pupil dilation of the user; in which the controller is configured to vary the smoothing operation in response to the detected pupil dilation. In example arrangements the controller may be configured to vary the smoothing operation in response to a rate of change of the detected pupil dilation. For example, if the detected pupil dilation is relatively small, the user's eyes may be considered to be able to handle a more rapid display brightness variation (a smaller characteristic time period) than if the detected pupil dilation is relatively large.

Figure 18:
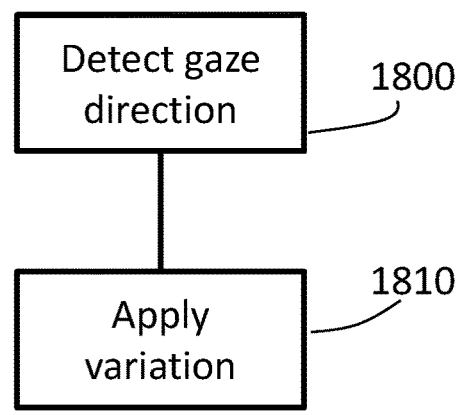

In other examples (in addition to or instead of the techniques of FIG. 17) a gaze direction detection may be employed. Here, in examples, a gaze detector (for example implemented by the camera(s) 305) may be configured to detect a gaze direction of the user while using the HMD, thereby detecting an image location which the user is observing; in which the controller may be configured to control the illumination level of the display images in response to an image brightness to be displayed at the image location which the user is detecting to be observing. In other words, referring to FIG. 18, the gaze direction is detected at a step 1800 and the variation is applied at a step 1810 in response to the detected gaze direction. For example, this may apply the same techniques as those shown in FIGS. 15 and 16 but in respect of image brightness variations applicable to the portion of the image at which the user is directing his or her gaze. In some examples, the gaze detector may comprise or at least be supplemented by a gaze direction predictor (such as a Kalman filtering arrangement applies to the detected gaze direction) to predict a gaze direction in response to actual detected gaze directions, so as to predict a gaze direction in respect of image content of next (not yet displayed) display images, with the processing described above being applied in respect of the image content in the still-to-be-displayed images at the predicted gaze location.

As mentioned above, the gaze detector may comprise one or more cameras 305 disposed within the HMD.

Control in respect of gaze detection could be arranged to vary the overall brightness of the display images as whole images, but in response to the detected brightness of the gazed-at (or predicted to be gazed-at) location, or could be arranged to vary the brightness of a region surrounding the gazed-at (or predicted to be gazed-at) location.

HDR Considerations

While the techniques described above can be relevant and useful in connection with any HMD and HMD system, they are particularly relevant to HMDs using so-called HDR (high dynamic range) displays. Such displays are capable of displaying brighter (and indeed darker) images than non-HDR displays. Although the term HDR does not necessarily imply a particular dynamic range representing a threshold beyond which a display is deemed to be "HDR", an example definition is provided in the International telecommunications Union (ITU)'s "Rec. 2100" (see for example ITU-R Recommendation ITU-R BT.2100-2 (July/2018) "Image parameter values for high dynamic range television for use in production and international programme exchange" (the entirety of which is hereby incorporated by reference), aspects of which can be applicable to or at least illustrative of general techniques for use in HMD technology. But in general in the field of HMDs, the term is used to refer to display techniques having a dynamic range which is at the upper end of the prevailing commercially available display techniques' dynamic ranges. Handling HDR display images can involve video capturing or generation, coding, compression and display techniques cooperating to handle a greater bit depth and luminance and colour volume than those applicable to handling lower or "standard" dynamic range (SDR) display images.

Therefore, the techniques discussed above are particularly relevant to such HMDs.

Regarding the control of brightness in respect of transitions (in either direction) between wearing and not wearing the HMD as described above, the greater brightness range available to an HDR HMD could (in the absence of such techniques) imply a greater difference between the ambient and display brightness, so that the techniques described above can help to alleviate any subjective disturbance caused by the user experiencing such a difference on putting on or taking off the HMD.

Regarding the smoothing operations discussed above, in the context of HMDs capable of HDR operation, the HMD is able to display brighter images than an SDR HMD and is also capable in principle of greater brightness transitions, for example from a very dark image (darker than would be possible using SDR techniques) to a very bright image (brighter than would be possible using SDR techniques) so that the magnitude of the brightness transition can be greater than that possible using SDR techniques. The techniques discussed above can help to alleviate any subjective disturbance caused by the user experiencing such a transition.

Further Variations

Instead of or in addition to processing pixel data relating to display images, the display brightness variations discussed above may be achieved at least in part by variations to the illumination of a display backlight provided at the HMD.

Example Data Processor

Figure 19:
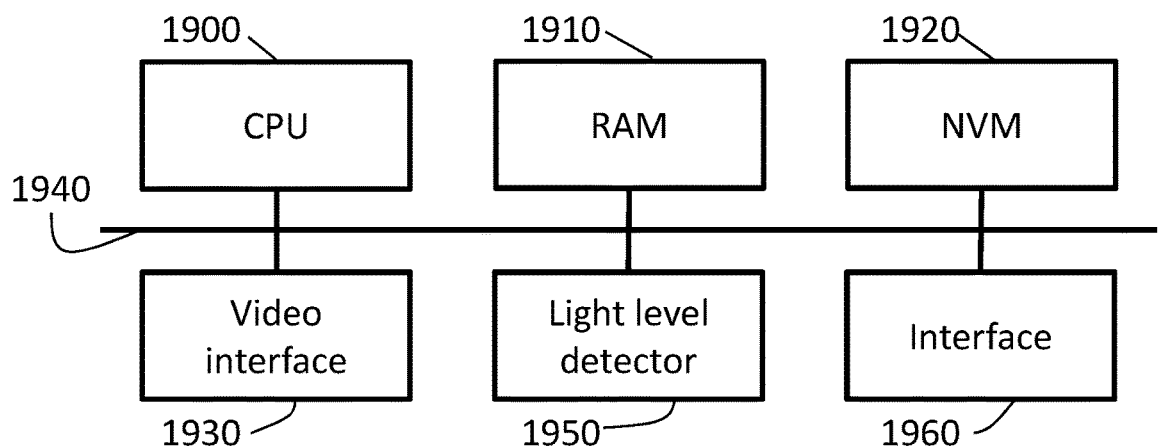
FIG. 19 schematically illustrates a data processing system.

FIG. 19 schematically illustrates a data processor which may provide processing discussed in connection with the base device, the HMD or both and in particular may implement at least some of the functionality of the "controller" discussed here. The data processor comprises a central processing unit (CPU) 1900, a random access memory (RAM) 1910, a non-volatile memory (NVM) 1920 such as disk storage and/or read only memory (ROM) and a video interface 1930 for providing display images for display to the user, interconnected by a bus structure 1940. Optionally, a light level detector 1950 such as a photocell or camera is provided for detecting ambient light levels; the processing of the detection can be carried out by the CPU 1900. An interface 1960 is provided to other parts of the overall system. The data processor operates according to the methods discussed in the present description, for example under the control of computer software such as computer software comprising successive machine-readable instructions which, when executed by the data processor of FIG. 19, cause the data processor of FIG. 19 to carry out one or more of the method steps discussed here. The software may be provided by a storage medium such as a non-transitory, machine-readable storage medium (for example, a disk medium or the NVM 1920).

Example HMD Systems

Here, it is noted that examples of the present technology may be implemented as an HMD system, being parts of such a system which provide a display signal to an HMD but do not necessarily include the HMD itself, or an HMD system including the HMD as well.

Figure 20:
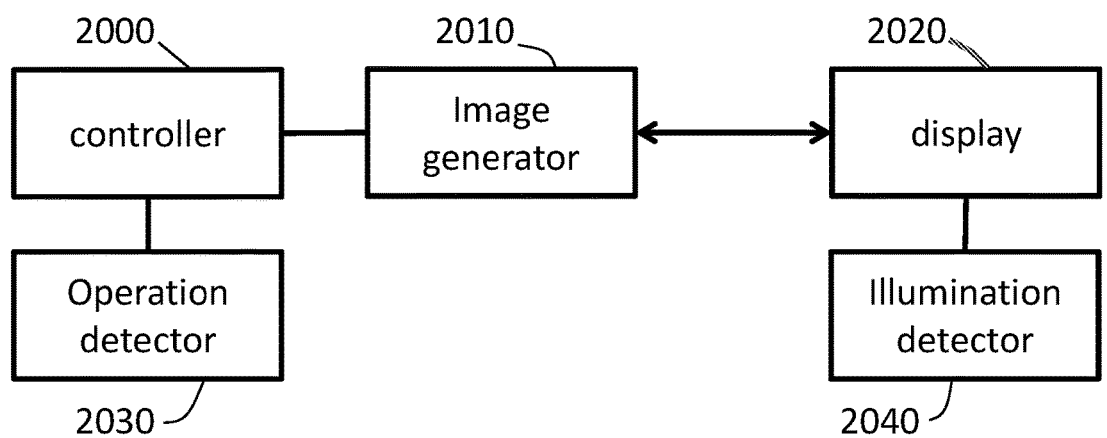
FIGS. 20 and 21 are respective schematic illustrations of HMD systems.

FIG. 20 schematically illustrates a head mountable display, HMD, system to display images to a user via an HMD 2020, for example generated by an image generator 2010, the HMD system comprising:

an illumination detector 2040 to detect an illumination level of an ambient environment around the HMD;

an operation detector 2030 to detect one or more operations indicative of one or both of: (i) initiation of the HMD being put on by the user; and (ii) initiation of the HMD being taken off by the user; and a controller 2000 to control the illumination level of the display images, the controller being configured to generate and apply a temporary illumination level variation to the display images in response to a detection of the one or more operations by the operation detector.

Figure 21:
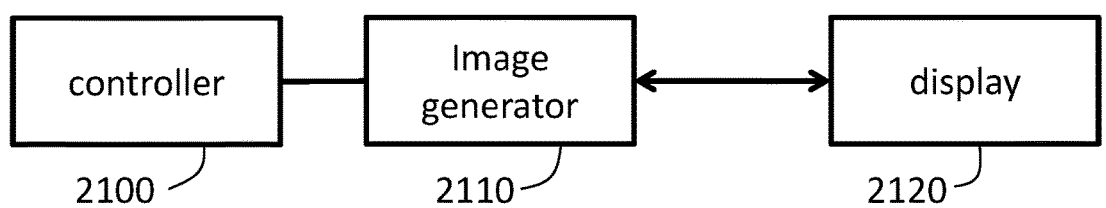

FIG. 21 schematically illustrates a head mountable display, HMD, system comprising:

an image generator 2110 to generate display images for display to a user via an HMD 2120; and a controller 2100 to control the illumination level of the display images, the controller being configured to generate and apply an illumination level variation to the display images so as to apply a smoothing operation to the illumination level.

Summary Methods

Figure 22:
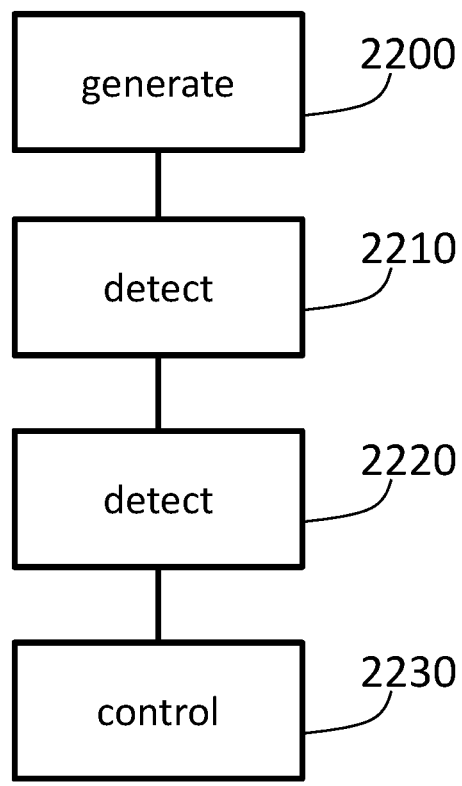
FIGS. 22 and 23 are respective schematic flowcharts showing operations of an example HMD system.

FIG. 22 is a schematic flowchart illustrating a method comprising:

generating (at a step 2200) display images for display to a user via a head mountable display, HMD;

detecting (at a step 2210) an illumination level of an ambient environment around the HMD;

detecting (at a step 2220) one or more operations indicative of one or both of: (i) initiation of the HMD being put on by the user; and (ii) initiation of the HMD being taken off by the user; and controlling (at a step 2230) an illumination level of the display images by generating and applying a temporary illumination level variation to the display images in response to a detection of the one or more operations.

Figure 23:
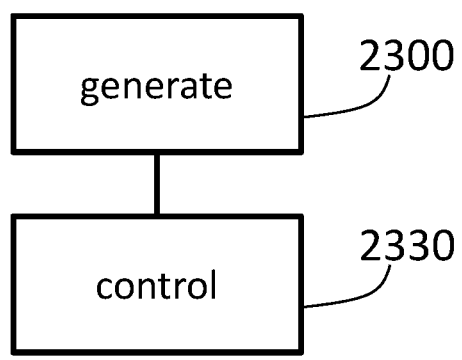

FIG. 23 is a schematic flowchart illustrating a method comprising:

generating (at a step 2300) display images for display to a user via an HMD; and controlling (at a step 2310) the illumination level of the display images by generating and applying an illumination level variation to the display images so as to apply a smoothing operation to the illumination level.

General Matters

In so far as embodiments of the disclosure have been described as being implemented, at least in part, by software-controlled data processing apparatus, it will be appreciated that a non-transitory machine-readable medium (or multiple instances of such media) carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein. Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A head mountable display, HMD, system to display images to a user via an HMD, the HMD system comprising:

one or more peripheral control devices;

an illumination detector to detect an illumination level of an ambient environment around the HMD;

an operation detector to detect one or more operations indicative of one or both of: (i) initiation of the HMD being put on by the user; and (ii) initiation of the HMD being taken off by the user; and a controller to control the illumination level of the display images, the controller being configured to generate and apply a temporary illumination level variation to the display images in response to a detection of the one or more operations by the operation detector, wherein:

the operation detector is configured to detect user touch to one or more of the peripheral control devices indicating that such is being handled by the user, and an operation indicative of the HMD being taken off by the user is that the user ceases handling the one or more of the peripheral control devices.

2. The HMD system of claim 1, in which the operation detector is configured to detect whether the HMD is currently being worn by the user and to detect user touch to the periphery of the HMD indicative of the HMD being handled by the user.

3. The HMD system of claim 1, in which the operation detector is configured to detect an ambient illumination level at a portion of the HMD which, in use, is substantially obscured by the user's head while the user is wearing the HMD.

4. The HMD system of claim 1, in which the operation detector is configured to detect a change in a current position and/or orientation of the HMD.

5. The HMD system of claim 1, comprising: an image generator to generate the display images.

6. The HMD system of claim 5, in which the operation detector is configured to detect an operation state of the image generator indicative of the user having finished an activity using the HMD.

7. The HMD system of claim 6, in which:
the illumination detector is configured to detect a current illumination of the display images; and
the controller is configured to apply the temporary illumination level variation as a variation relative to the current illumination of the display images.

8. The HMD system of claim 7, in which the temporary illumination level variation is configured to decay towards a zero variation according to a decay time constant.

9. The HMD system of claim 8, in which the decay time constant is a predetermined decay time constant.

10. The HMD system of claim 6, in which: the controller is configured to set the current illumination of the display images to an illumination level dependent only on the detected illumination level of an ambient environment around the HMD.

11. The HMD system of claim 5, in which
the image generator comprises a game engine; and
the controller is configured to control operation of the game engine so as to vary the illumination of the display images.

12. The HMD system of claim 1, in which the controller is configured to compare the detected illumination level of the ambient environment with a predetermined range of ambient illumination levels and to generate the temporary illumination level variation in response to the comparison.

13. The HMD system of claim 1, in which the controller is configured to generate the temporary illumination level variation so as to decrease the illumination level of the display images in response to a detection by the illumination detector that the illumination level of the display images is relatively high and the illumination level of the ambient environment around the HMD is relatively low.

14. The HMD system of claim 1, in which the controller is configured to generate the temporary illumination level variation so as to increase the illumination level of the display images in response to a detection by the illumination detector that the illumination level of the display images is relatively high and the illumination level of the ambient environment around the HMD is relatively low.

15. The HMD system of claim 1, comprising: a head-mountable display to display the display images.

16. The HMD system of claim 15, in which: the illumination detector comprises an optical detector mounted on the HMD.

17. The HMD system of claim 16, in which: the illumination detector comprises a filter to filter the detected illumination levels.

18. The HMD system of claim 1, in which the illumination detector comprises a geographical location detector.

19. The HMD system of claim 1, comprising a user-operable control; in which the controller is configured to control the illumination level of the display images in response to user operation of the user-operable control.

20. The HMD system of claim 1, comprising:
an image generator to generate display images for display to a user via an HMD,
wherein the controller is operable to control the illumination level of the display images, the controller being configured to generate and apply an illumination level variation to the display images so as to apply a smoothing operation to the illumination level.

21. The HMD system of claim 20, comprising a detector to detect a pupil dilation of the user; and in which the controller is configured to vary the smoothing operation in response to the detected pupil dilation.

22. The HMD system of claim 21, in which the controller is configured to vary the smoothing operation in response to a rate of change of the detected pupil dilation.

23. The HMD system of claim 20, comprising:
a gaze detector to detect a gaze direction of the user while using the HMD, thereby detecting an image location which the user is observing;
in which the controller to control the illumination level of the display images in response to an image brightness to be displayed at the image location which the user is detecting to be observing.

24. The HMD system of claim 23, in which the gaze detector comprises one or more cameras disposed within the HMD.

25. The HMD system of claim 23, in which the gaze detector comprises a gaze direction predictor to predict a gaze direction in response to image content of the display images.

26. The HMD system of claim 20, comprising: a head-mountable display to display the display images.

27. A method comprising:
generating display images for display to a user via a head mountable display, HMD;
providing one or more peripheral control devices;
detecting an illumination level of an ambient environment around the HMD;
detecting one or more operations indicative of one or both of: (i) initiation of the HMD being put on by the user; and (ii) initiation of the HMD being taken off by the user; and
controlling an illumination level of the display images by generating and applying a temporary illumination level variation to the display images in response to a detection of the one or more operations, wherein:
the detecting one or more operations includes detecting user touch to one or more of the peripheral control devices indicating that such is being handled by the user, and an operation indicative of the HMD being taken off by the user is that the user ceases handling the one or more of the peripheral control devices.

28. The method of claim 27, wherein:
the controlling the illumination level comprises applying a smoothing operation to the illumination level.

29. A non-transitory, computer readable storage medium containing computer software which, when executed by a computer, causes the computer to perform a method comprising:
generating display images for display to a user via a head mountable display, HMD;
providing one or more peripheral control devices;
detecting an illumination level of an ambient environment around the HMD;
detecting one or more operations indicative of one or both of: (i) initiation of the HMD being put on by the user; and (ii) initiation of the HMD being taken off by the user; and
controlling an illumination level of the display images by generating and applying a temporary illumination level variation to the display images in response to a detection of the one or more operations, wherein:
the detecting one or more operations includes detecting user touch to one or more of the peripheral control devices indicating that such is being handled by the user, and
an operation indicative of the HMD being taken off by the user is that the user ceases handling the one or more of the peripheral control devices.

30. The non-transitory, computer readable storage medium of claim 29 wherein the controlling the illumination level comprises applying a smoothing operation to the illumination level.

* * * * *